May 9, 1950 G. L. USSELMAN 2,507,178

SINGLE SIDE BAND MODULATOR

Filed July 17, 1946 2 Sheets-Sheet 1

INVENTOR
GEORGE L. USSELMAN
BY H. S. Grover
ATTORNEY

INVENTOR
GEORGE L. USSELMAN
BY H. S. Grover
ATTORNEY

Patented May 9, 1950 2,507,178

UNITED STATES PATENT OFFICE 2,507,178

SINGLE SIDE BAND MODULATOR

George L. Usselman, Port Jefferson, N. Y., assignor to Radio Corporation of America, a corporation of Delaware Application July 17, 1946, Serial No. 684,118

7 Claims. (Cl. 332—45)

This application discloses an invention applicable to modulators in general and in particular to single side band modulators in which the carrier energy and one set of side bands are eliminated or greatly reduced. This leaves one set of side bands for signaling purposes such as transmission by radiation or over land lines to a receiving point. Ordinarily either the upper or the lower side band may be selected. However, it is preferable in the case of this invention to select the upper set of side bands.

In most transmitters of the single side band type it is usual to employ several filters throughout the transmitter stages to reject the unwanted carrier and side bands and to pass the desired side band on through the transmitter for use. Filters are difficult and expensive to build so that they add materially to the cost of constructing the transmitter. Furthermore, once a filter is built it is difficult to change the characteristics thereof to a mtaerial extent and this makes a transmitter using filters comparatively inflexible in operation.

An object of the present invention is to provide an improved transmitter of the single side band type wherein side band selection is accomplished without the use of a large number of filters.

A further object of the present invention is to provide a single side band transmitter wherein side band selection is made without the use of a large number of filters and wherein the selected side band currents are increased in frequency as desired.

An additional object of the present invention is to provide a single side band transmitter wherein by elimination of most of the usual filter circuits the flexibility of a transmitter is increased so that it may be readily used in various transmission bands without the need of rebuilding filters or supplying new filters.

Another object of this invention is to reduce the cost of a side band transmitter by reducing the number of filters required.

The above objects are attained in accordance with the invention by use of a plurality of balanced modulators wherein the carrier currents are so selected that the lower side band frequencies are so widely removed in percentage from the frequencies of the upper side band as to eliminate the need of filtering circuits between stages. A filter stage, therefore, is necessary only to separate one of the side bands from the carrier and other side band in the first modulator stage. After sufficient band separation is obtained by cascade modulators as described above ordinary tuned circuits and modulators may be used to boost the frequency of the modulated carrier to the desired output frequency.

Figure 2:
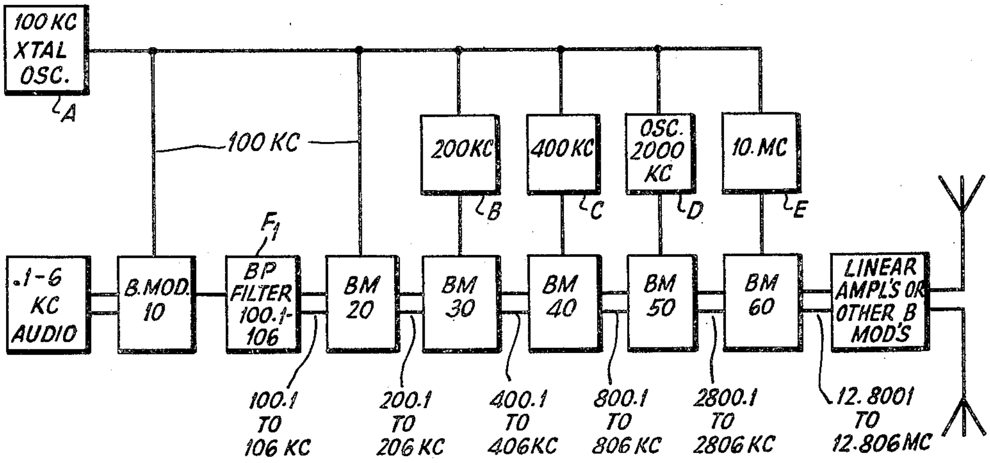
Figure 3:
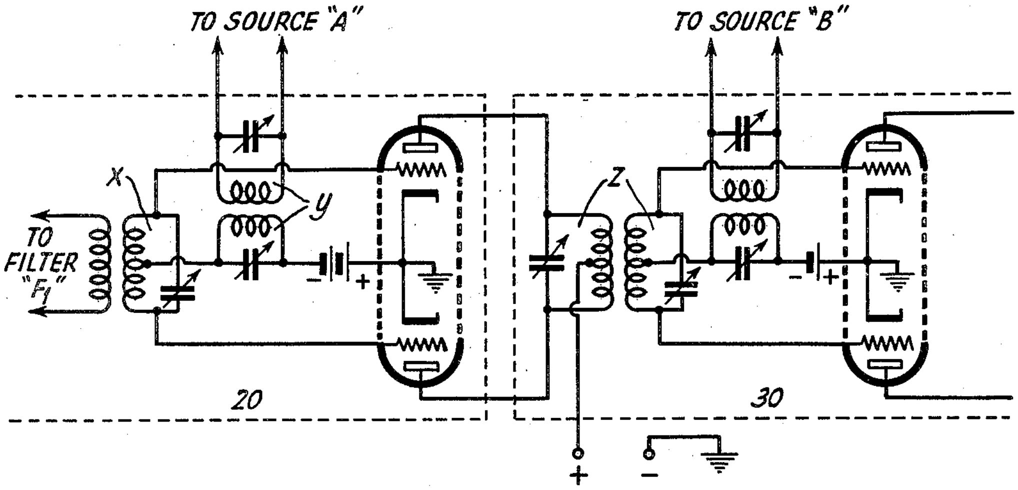
Figure 3A:
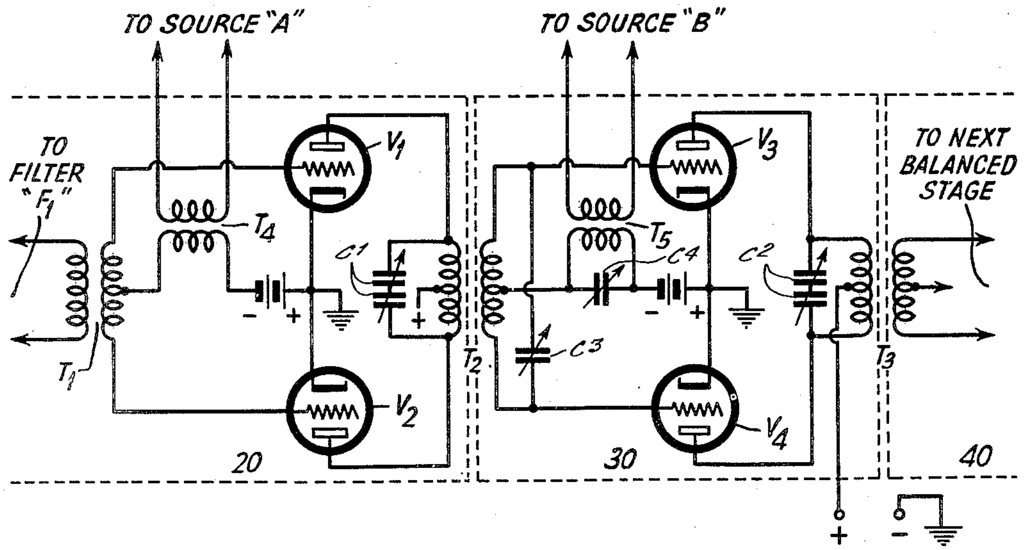

In describing my invention in detail reference will be made to the attached drawings wherein Figs. 1 and 2 each show an embodiment of my improved single side band system, and Figures 3 and 3*a* illustrate basic balanced modulator circuits satisfactory for use in my improved modulator.

Figure 1:
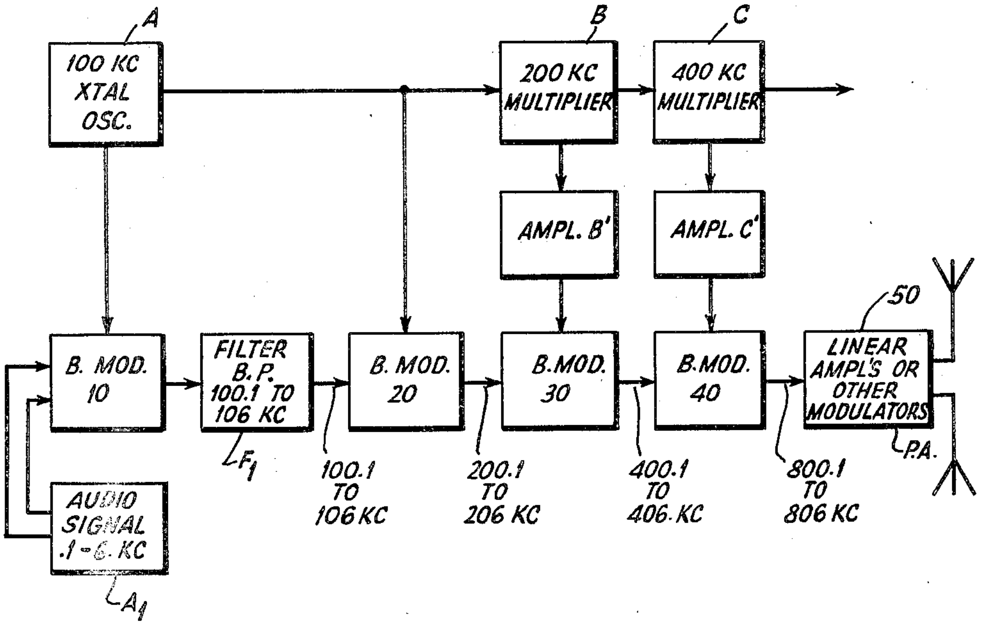

In Figures 1 and 2 I have used rectangles to illustrate the invention. Moreover, in the sake of simplicity the rectangles are connected by single leads although it will be understood in practice that at least two conductors are used in the connections between stages. Rectangles have been used in these figures of the drawings because the filter, the oscillators, amplifiers, etc. used therein may be conventional circuits or any satisfactory type of circuits. The modulators per se may be of known types although the use thereof and manner of excitation thereof is novel I believe. The basic elements of balanced modulators arranged for satisfactory use in my improved system have been shown in Figure 3. The input and output circuits X and Z of Figure 3 should be tunable as shown in my U. S. Patent 1,876,107. Inductive coupled output as shown in Fig. 3 is also desirable to aid in filtering action. The tuned carrier circuits (*y*) in Fig. 3 may be used but are not essential because only a single frequency is involved at this point. The balanced modulators may use triode tubes or they may use tetrode tubes as shown in my U. S. Patent 2,134,065.

In Fig. 1, A is a source of oscillatory energy of fixed frequency such as might be obtained from a crystal controlled oscillator directly or through frequency multipliers. A1 represents a source of audio signals which may be of any desired range and may represent voice, telegraphy, facsimile, etc. To simplify the description, it is assumed that the audio signals have a range from 100 cycles to 6000 cycles per second. Other ranges may be used. 10 represents a balanced modulator basically of the type illustrated in Carson Patents 1,343,307 and 1,343,308. Rectangles 10, 20, 30 and 40 represent balanced modulators which are essentially alike except for the changes in tuning reactances, etc. necessary to operate at different frequencies.

B and C represent carrier sources of appropriate frequencies. These sources may be separate, with respect to each other and source A, and may comprise crystal controlled oscillators and frequency multipliers. Preferably sources B and C are frequency multipliers of which B multiplies the oscillatory energy supplied thereto from source A while C multiplies the oscillatory energy supplied thereto from stage B. The energies of B and C may be amplified by additional amplifiers B′ and C′ before they are delivered to the modulators. Frequency multipliers are used here to reduce the number of carrier generators—which are usually crystal controlled and consequently are more expensive. F1 is a band pass filter. The rectangle 50 represents linear amplifiers and/or other modulator stages and is designated generally as the power amplifier which supplies the output to a radiator.

In describing the operation it will be noted that the first few stages are similar in arrangement to that of the ordinary single side band modulator. These stages consist of modulation source A1, steady frequency oscillator A, balanced modulator 10 and the band pass filter F1. The audio is assumed to be 100 to 6000 cycles and the oscillator A output is assumed to be 100 kilocycles per second. Then the balanced modulator 10 suppresses the carrier (100 kc.) frequency and the filter F1 rejects both the carrier and one of the side bands. In the example given, it is assumed that the lower set of side frequencies are rejected and the upper set of side frequencies in a band extending from 100.1 to 106 kilocycles are passed on to the next balanced modulator in unit 20. In the balanced modulator 10 to accomplish carrier suppression the oscillatory energy from source A is impressed in push-push relation on the tubes.

The single side band appearing at the output of filter F1 is delivered in push-pull relation to the tubes in the balanced modulator 20. The coupling circuits may be as illustrated in Figs. 3 and 3*a*. Some of the output from the 100 kilocycles per second oscillator in source A is fed in push-push or parallel relation to the tubes in the balanced modulator 20. In the ordinary system this modulator 20 is followed by another band pass filter. However, in my improved system it will be seen that the lower side frequencies from the balanced modulator 20 are in the band of 100 to 6000 cycles per second, that is, are in the modulation or audio range. The coupling circuit X of Figure 3 may be tuned to resonance at about the center of the upper side band spectrum, i. e. to a frequency intermediate 100.1 and 106 kilocycles per second. The coupling circuits Y may be tuned to resonance at the carrier frequency which is 100 kilocycles per second. However, tuning of the "Y" circuits is not necessary and ordinary untuned coupling circuits may be used at this point because only a single frequency is involved. The coupling circuits Z may be tuned to resonance at the next upper side band frequency of 200.1 to 206 kilocycles per second. Output tuning of a carrier suppression modulator was first shown in my U. S. Patent 1,876,107. The lower side band of modulator 20 cannot pass through the tuned coupling circuits used to feed the upper side frequencies of 200.1 to 206 kilocycles per second to the next balanced modulator 30. The carrier frequency of 100 kilocycles being applied in push-push relation to the grids of the tubes in the balanced modulator 20 is suppressed in the tuned anode circuit and does not appear on the input of the next balanced modulator stage 30. This suppression of all but one side band is accomplished without the use of filters between modulators 20 and 30.

The side band taken from the balanced modulator 20 extends from 200.1 to 206 kilocycles and is fed in push-pull relation to the tubes in the balanced modulator 30. The oscillatory energy of fixed frequency at 200 kilocycles per second is fed to the tubes in the balanced modulator 30 in push-push relation by frequency multiplier or oscillator B. Again the 200 kilocycle carrier is suppressed in the output of the balanced modulator 30. Moreover, the lower side band frequencies are again in the range 100 to 6000 cycles and will not pass through the coupling circuits between the balanced modulator 30 and the balanced modulator 40. This again eliminates the need of band pass filters at this point. In a similar fashion the upper side band frequencies of 400.1 to 406 kilocycles per second are delivered by the balanced modulator 30 in push-pull relation to the tubes in balanced modulator 40 while carrier frequency current of 400 kilocycles per second is applied in push-push relation to the tubes in balanced modulator 40 from the frequency multiplier or oscillator C. Again the carrier frequency of 400 kilocycles is suppressed by the modulation action and the lower side frequencies of 100 to 6000 cycles are too low to feed through the couplings to the next stage. The upper side frequencies from the balanced modulator 40, which are in the range of 800.1 to 806 kilocycles, may be further heterodyned up in succeeding balanced modulator stages if desired or they may be amplified in successive linear amplifier stages and radiated by the antenna. The linear amplifiers in unit 50 may be conventional and if modulators are used herein they may be similar to those used in the previous stages.

It will be noted that in this system of Fig. 1 only one filter stage is used, this being the filter F1 between the modulator 10 and the modulator 20.

After sufficient band separation is obtained by balanced modulator stages such as 20, 30 and 40 of Fig. 1 tuned circuits may be sufficient to give the desired separation between one side band and the other side band and the carrier. Then the transmitter may be as illustrated in Fig. 2 of the drawings. In Fig. 2 the transmitter may be the same as that disclosed in Fig. 1 up to and including the balanced modulator 40. If it is desirable to go higher in frequency a larger change in frequency may be taken in one modulator, for example, in the balanced modulator 50. The upper side band frequencies in the range 800.1 to 806 kilocycles per second supplied by the balanced modulator 40 are fed in push-pull relation to the tubes on the balanced modulator 50. Here, however, a constant frequency of say, for example, 2000 kilocycles per second may be delivered in push-push relation to the tubes in balanced modulator 50 from an oscillator D which may be harmonically related to the preceding oscillators in B and C or need not be harmonically related thereto. The energy of carrier frequency of 2000 kilocycles per second is suppressed in balanced modulator 50. The lower side frequencies of 1194 to 1199.9 kilocycles per second are easily rejected by output tank circuit tuning of the balanced modulator 50 which is tuned to pass the upper side frequency of 2800.1 to 2806 kilocycles per second. This is because of the wide frequency separation between lower and upper side bands. The output of balanced modulator 50 which is in the 2800.1 to 2806 kilocycles per second range is likewise delivered in push-pull relation to balanced modulator 60. A constant frequency carrier of say, 10,000 kilocycles per second may be fed in push-push relation to the tubes in balanced modulator 60 from oscillator E. The oscillator E may be a separate source or may be harmonically related to the oscillator in D. The balanced modulator 60 suppresses the 10,000 kilocycles carrier due to its inherent characteristic. The lower side frequencies are 7194 to 7199.9 kilocycles. The upper side frequencies are 12800.1 to 12806 kilocycles per second so that due to the separation between the upper and lower side frequencies the lower side frequencies are readily rejected by the output tank circuit tuning of the balanced modulator 60. This tank circuit is tuned to pass the upper side frequency which it does to excite the power amplifier PA containing the desired linear amplifiers or other balanced modulators. Preferably the modulator tank circuits are of the high "Q" type to improve the characteristics of the circuit and the ability thereof to reject the unwanted side frequencies and to pass the wanted side frequencies.

It can be seen that the invention resides in the method of suppressing the unwanted carrier and side frequencies which allows the transmission of the desired side frequencies. This is done, with a minimum use of wave filters, by beating down one set of side frequencies to a low frequency value in the balanced modulators and by tuning of the balanced modulators' ouput circuit to reject the lower side frequencies and to pass the higher side frequencies. In other words, a heterodyning method is used to widely separate the lower and upper set of side frequencies in a carrier suppression type of modulator which has its output circuit tuned to pass the upper set of side frequencies which consequently rejects or attenuates all other frequencies. Where it is feasible the lower set of side frequencies are heterodyned down substantially to the original audio signal frequency which make them more easily rejected. This also allows a larger frequency gain by substantially doubling the upper set of side frequencies. It may be found beneficial in most cases to use high "Q" tuned circuits in the output circuits of the various stages. These output circuits would be tuned to pass the desired upper side frequencies and this would then reject all other frequencies.

As stated, any satisfactory type of balanced modulator may be used, except it is desirable that the output circuit be tunable. In this type of transmitter it is necessary to use linear amplifiers throughout. The designated frequencies are used only for illustration since obviously other frequencies may be used in accordance with my invention.

A balanced modulator as illustrated in Figure 3*a* may be used. The input to balanced modulator stage 20 tubes V1—V2 need not be tuned because transformer T1 is the ouput of the filter F1 and the transformer T4 is the ouput of single frequency source A. The output transformer T2 of modulator tubes V1—V2 is preferably tuned, in this case by condenser C1. This circuit is tuned to the upper side band and it rejects all other frequencies. The secondary of T2 is shown tuned by condenser C3. However, this is not necessary as a rule because condenser C1 tunes the entire transformer unless there is considerable flux leakage between primary and secondary windings. The transformer T5 is shown tuned by condenser C4 but this is not really necessary because ony one frequency is involved and no filtering is necessary. However, tuning might be necessary to enhance the carrier voltage. The output of balanced modulator tubes V3 and V4 is tuned by transformer T3 and condenser C2. The secondary of transformer T3 is shown without a condenser, assuming that C2 tunes the whole transformer. The balanced modulators may use triode tubes or they may use tetrode tubes as shown in my U. S. Patent 2,134,065.

What is claimed is:

1. A transmitting system comprising a plurality of balanced modulators in cascade with differential or push-pull couplings between the output of each modulator and the input of the following modulator, means for applying side band energy, resulting from modulation of a carrier by signals, in push-pull relation to the first modulator, means for applying carrier currents in parallel to all of the modulators, and means for tuning the output circuit of each modulator to the upper side band of the modulation components appearing therein, said applied carriers each being of a frequency of the order of the frequency of the side band by which they are modulated.

2. A transmitting system comprising a plurality of balanced modulators in cascade with differential or push-pull couplings between the output of each modulator and the input of the following modulator, means for applying modulating potentials in push-pull relation to the first balanced modulator, means for applying carrier currents in parallel to all of the modulators, and means for tuning the output circuit of each of the modulators except the first to the upper side band of the modulation components appearing therein.

3. A transmitting system comprising a plurality of balanced modulators in cascade with differential or push-pull couplings between the output of each modulator and the input of the following modulator, means for applying side band energy, resulting from modulation of a carrier by signals, in push-pull relation to the first modulator, means for applying carrier currents in parallel to all of the modulators, and means for tuning each modulator to the upper side band of the modulation components appearing therein, said applied carriers each being of a frequency of the order of the frequency of the side band by which they are modulated.

4. A transmitting system comprising a plurality of modulators each having input circuits and output circuits, connections coupling the modulators in cascade comprising couplings between the output circuit of each modulator and the input circuit of the following modulator, apparatus for applying modulating potentials to the first modulator, a filter in the coupling between the output circuit of the first modulator and the input circuit of the second modulator, apparatus for applying carrier currents to all of the modulators, and reactances for tuning each of the modulators, except the first, to the upper side band of the modulation components appearing therein, each of said applied carriers except that applied to the first modulator being of a frequency of the order of the frequency of the side band by which they are modulated.

5. A system as recited in claim 4 wherein said reactances for tuning the modulators, except the first, are in the output circuits of the respective modulators.

6. A transmitting system comprising a plurality of modulators each having an input circuit and an output circuit, connections coupling the modulators in cascade comprising couplings between the output circuit of each modulator and the input circuit of the following modulator, a source of side band energy, resulting from modulation of a carrier of frequency F by signals, coupled to the input circuit of the first modulator in the cascaded connections, apparatus for applying carrier currents to all of the modulators, and apparatus for tuning each modulator to the upper side band of the modulation components appearing therein, said applied carriers each being of a frequency of the order of the side band by which they are modulated.

7. A system as recited in claim 6 wherein said tuning apparatus comprises a reactor in the output circuit of each modulator.

GEORGE L. USSELMAN.

REFERENCES CITED

The following references are of record in the file of this patent:

UNITED STATES PATENTS

| Number | Name | Date |
|---|---|---|
| 1,361,488 | Osborne | Dec. 7, 1920 |
| 1,993,395 | Beers | Mar. 5, 1935 |
| 2,134,065 | Usselman | Oct. 25, 1938 |
| 2,246,184 | Peterson | June 17, 1941 |